US008553722B2

(12) United States Patent
Calvarese et al.

(10) Patent No.: US 8,553,722 B2
(45) Date of Patent: Oct. 8, 2013

(54) METHOD AND APPARATUS FOR PROVIDING SPATIALLY SELECTABLE COMMUNICATIONS USING DECONSTRUCTED AND DELAYED DATA STREAMS

(75) Inventors: Russell E. Calvarese, Stony Brook, NY (US); Thomas E. Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 103 days.

(21) Appl. No.: 13/325,216

(22) Filed: Dec. 14, 2011

(65) Prior Publication Data

US 2013/0156049 A1     Jun. 20, 2013

(51) Int. Cl.
*H04M 1/66* (2006.01)

(52) U.S. Cl.
USPC ............................ 370/474; 370/519; 370/334

(58) Field of Classification Search
USPC ................. 370/334, 474, 536, 542, 543, 545, 370/464, 465, 508, 517, 519
See application file for complete search history.

(56) References Cited

U.S. PATENT DOCUMENTS

| 6,438,367 | B1 * | 8/2002 | Crawford ...................... 455/410 |
| 7,242,964 | B1 * | 7/2007 | Aiken et al. .................. 455/561 |
| 7,436,903 | B2 * | 10/2008 | Sandhu et al. ................ 375/315 |
| 7,519,136 | B2 | 4/2009 | Qi et al. |
| 7,609,608 | B2 | 10/2009 | Rogerson et al. |
| 2009/0239551 | A1 | 9/2009 | Woodsum |

FOREIGN PATENT DOCUMENTS

| EP | 2028782 A2 | 2/2009 |
| EP | 2194735 A1 | 6/2010 |
| WO | 2007093404 A1 | 8/2007 |

OTHER PUBLICATIONS

International Search Report and Written Opinion dated Mar. 13, 2013 in related case PCT/US2012/067941.

* cited by examiner

*Primary Examiner* — Thai Nguyen

(57) ABSTRACT

A sending device having a processing device and a plurality of transmitters performs a method for providing spatially selectable communications using deconstructed and delayed data streams. The method includes receiving a data stream, an indication of a target point for the data stream, and a target volume around the target point. The method further includes deconstructing the data stream into a plurality of data substreams and, based on a spatial relationship between a corresponding transmitter and the target point, determining a transmitter delay for each transmitter. Moreover, the method further includes determining, based on the target volume, a data interval spacing to apply between each data substream at transmission. In addition, the method includes sending, from the transmitters, the corresponding data substreams using the corresponding transmitter delays and the data interval spacing that confine reconstruction of the data substreams back into the data stream within the target volume.

18 Claims, 8 Drawing Sheets

METHOD AND APPARATUS FOR PROVIDING SPATIALLY SELECTABLE COMMUNICATIONS USING DECONSTRUCTED AND DELAYED DATA STREAMS

FIELD OF THE DISCLOSURE

The present disclosure relates generally to wireless communications and, in particular, to a method and apparatus for providing spatially selectable communications using deconstructed and delayed data streams.

BACKGROUND

In a wireless communication system, a sending device (i.e., sender) transmits data to one or more receiving devices (i.e., receivers) via a wireless carrier (also referred to herein as a transmission carrier) that propagates through a transmission medium (e.g., air-filled space). Wireless carriers include, but are not limited to, sound energy, radio frequency energy, and light energy. Sound energy exists as vibrational acoustic waves (including sound, ultrasound, and infrasound) that travel through a transmission medium. Similarly, radio frequency energy and light energy exist as respective electromagnetic waves and light waves that travel through a transmission medium.

Transmitted data (e.g., voice, video, or text data) over a wireless carrier is represented by signals that travel from a sender to a receiver. Oftentimes, there are intermediary devices, such as repeaters and base stations, that relay the signals from the sender to the receiver. Signals are generated by and propagated from a sender, such as a radio station that transmits radio broadcasts via electromagnetic waves with frequencies below those of visible light. The broadcast signals are received by compatible receiving devices that are in proximity to the sender or an intermediary device relaying the signals. For example, an amplitude modulation (AM) radio station broadcasts radio signals to AM radios. Within the vicinity of the AM radio station, where the signals are strong enough, AM radios are capable of receiving the radio signals and allowing listeners to tune in to the AM radio station.

In some cases, data is only intended for particular receivers. Accomplishing this under some present technologies generally requires that the intended receiving devices be identified in advance. For example, where a Short Message Service (SMS) message (e.g., text message) is intended for a specific cellular phone, the cellular phone is identified in advance by the message sender. In this way, the SMS message can be embedded with security features (such as identification and encryption) so that the SMS message is properly routed to the intended receiver, and only the intended receiver is able to access and decipher the message.

It is sometimes expedient to send data to receivers on the basis of location rather than identity. Spatially dependent communication is especially useful when the identification of intended receivers within a defined spatial volume (also interchangeably referred to herein as "target volume") is not known, or the intended receivers are mobile devices that may only be within a target volume for a short period of time.

Accordingly, there is a need for a method and apparatus for providing spatially selectable communications using deconstructed and delayed data streams.

BRIEF DESCRIPTION OF THE DRAWINGS

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Figure 1:
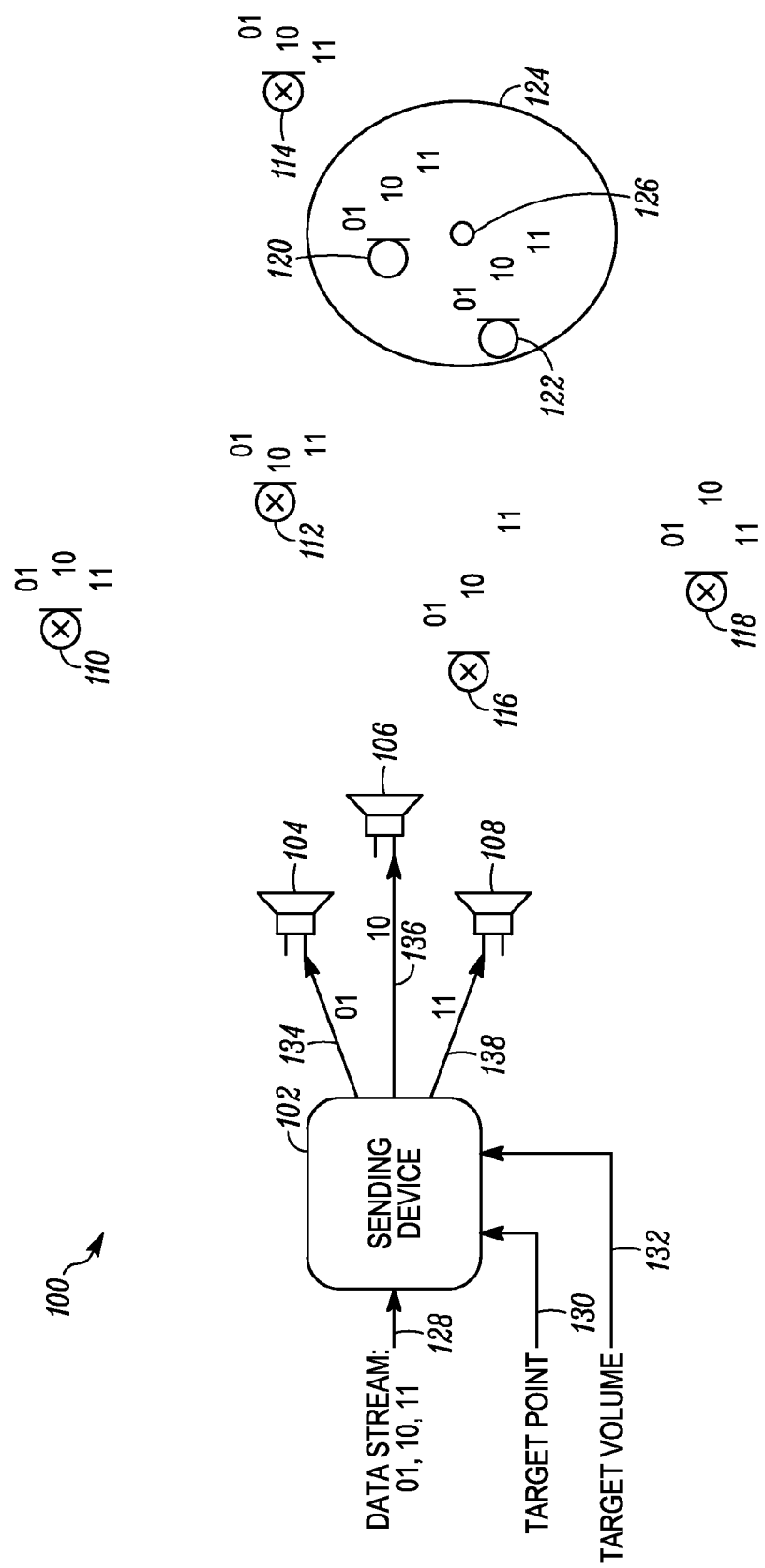
FIG. 1 illustrates a wireless communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for providing spatially selectable communications using deconstructed and delayed data streams. In accordance with the present teachings, a method is performed by a sending device apparatus that includes a plurality of transmitters, and a non-transient computer-readable storage element having computer readable code stored thereon programs a computer within the sending device to perform the method. As used herein, a plurality means more than one. The method includes receiving a data stream into the sending device from a data source, and receiving an indication of a target point for the data stream and a target volume around the target point. The method further includes deconstructing the data stream into a plurality of data substreams. Each of the plurality of data substreams is sent by a different one of the transmitters. In addition, the method includes determining a corresponding transmitter delay for each transmitter used to send one of the data substreams. The transmitter delay is based on a spatial relationship between the target point and the corresponding transmitter. Moreover, the method includes determining, based on the target volume, a data interval spacing to apply between each data substream at transmission. The applied data interval spacing and the transmitter delays prevent reconstruction of the data substreams back into the original data stream in all areas in space except within the target volume. The method further includes sending, from the transmitters, the corresponding data substreams using the corresponding transmitter delays and with the data interval spacing between each data substream.

Referring now to the drawings, and in particular FIG. 1, an illustrative wireless communication system implementing embodiments in accordance with the present teachings is shown and indicated generally at 100. System 100 comprises a sending device 102 having three transmitters 104-108, and seven receiving devices 110-122. Only a limited number of system elements 104 to 122 are shown for ease of illustration; but additional such elements may be included in the communication system 100. Moreover, other components needed for a commercial embodiment of the system 100 are omitted from the drawing for clarity in describing the enclosed embodiments. Furthermore, in this illustrative implementation, wireless communication system 100 is a sound communication system meaning that the transmission carrier between the sending and receiving devices is sound energy (existing as acoustic waves). However, the teachings herein are applicable to other types of transmission carriers, such as radio frequency energy (existing as radio or electromagnetic waves) and light energy (existing as light waves).

The sending device 102 includes a wireless network interface to receive a data stream 128 from a data source (not shown). Alternatively, the sending device 102 can use a Universal Serial Bus (USB) wired interface or other types of wired or wireless interfaces to receive the data stream 128 from a data source. The sending device 102 further includes a plurality of transmitters 104-108. Each transmitter includes a digital-to-analog converter, an amplifier, and a speaker (not shown). The transmitters 104-108 send energy (for example, in this case, in the form of analog signals) to the receiving devices 110-122. Moreover, the sending device 102 includes a microprocessor (not shown) and a memory component (not shown). In one embodiment, the sending device 102 is a Radio Frequency Identification (RFID) reader that includes a microprocessor, I/O component, a plurality of transmitters, an antenna, etc. The transmitters 104-108 and the receiving devices 110-122 are located at various locations in three dimensional space. Each receiving device, in this case, includes an analog signal receiving component (such as an antenna), an analog-to-digital converter, and a processing device (not shown). The receiving devices 110-122 use the analog-to-digital converter (such as analog-to-digital converters or diode detectors) to convert received analog signals into digital signals. Alternatively, the receiving devices 110-122 use diode detectors or other types of analog signal converting components to convert received analog signals into digital signals.

In general, as used herein, the sending device 102 and the receiving devices 110-122 or their hardware being "configured" or "adapted" means that such elements are implemented using one or more (although not shown) memory devices, network interfaces, modulating devices, digital to analog converters, analog to digital converters, transceivers, amplifiers, and/or processing devices that are operatively coupled, and which, when programmed, form the means for these system elements to implement their desired functionality, for example, as illustrated by reference to the methods shown in FIGS. 2-8. The network interfaces are used for passing signaling also referred to herein as messaging (e.g., messages, packets, datagrams, frames, superframes, data streams, and the like) containing control information between the elements of the system 100. The network interfaces comprise elements including processing, modulating, and transceiver elements that are operable in accordance with any one or more standard or proprietary wired or wireless interfaces. Some of the functionality of the processing, modulating, digital to analog converting, analog to digital converting, transceivers, and amplifiers elements may be performed by means of the processing device through programmed logic such as software applications or firmware stored on the memory device of the system element or through hardware.

The processing devices utilized by the elements of system 100 may be partially implemented in hardware and, thereby, programmed with software or firmware logic or code for performing functionality described by reference to FIGS. 2-8; and/or the processing devices may be completely implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Figure 2:
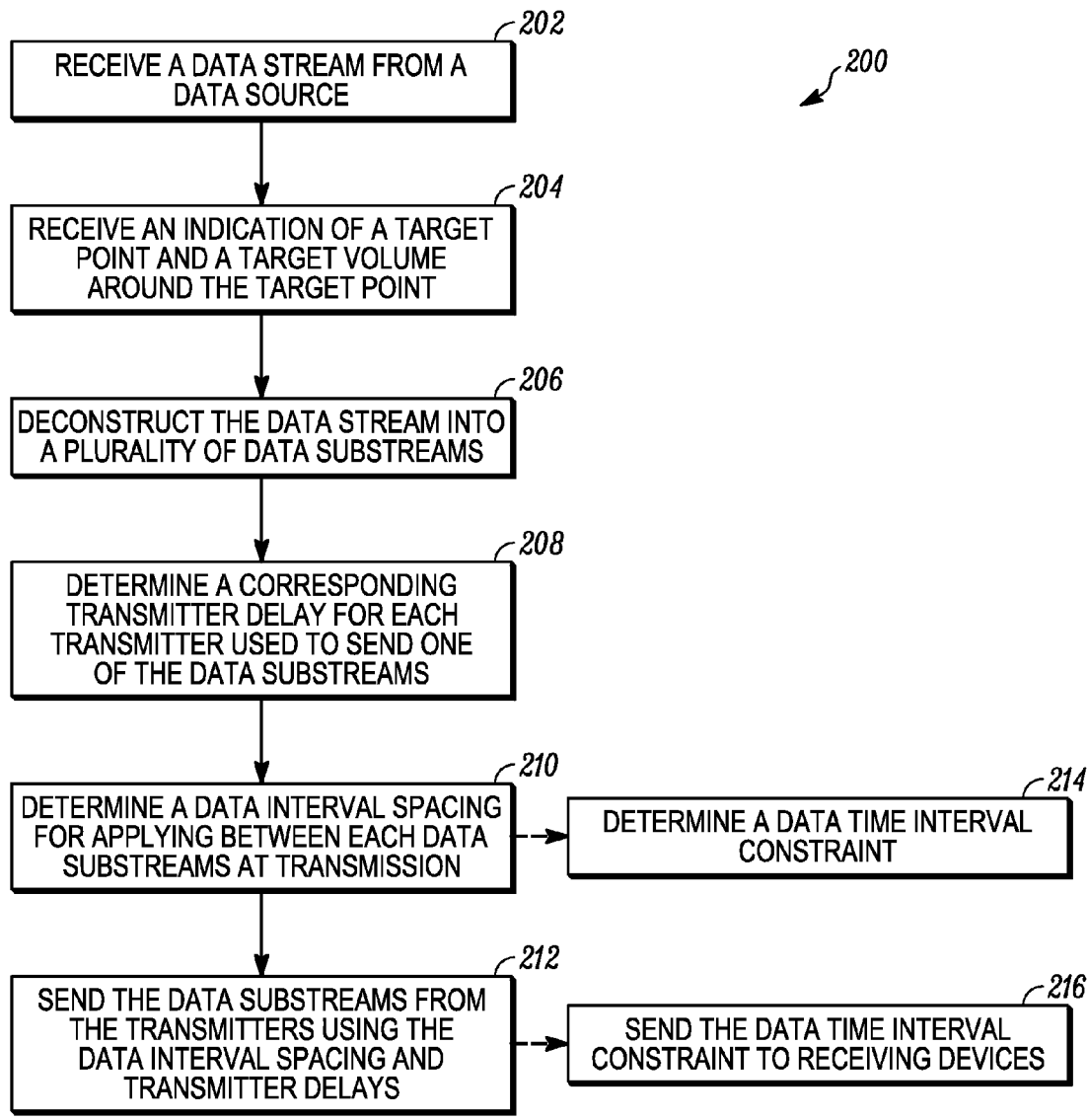
FIG. 2 is a logical flowchart illustrating a method for providing spatially selectable communications using deconstructed and delayed data streams in accordance with some embodiments.

We now turn to a detailed description of the functionality of the system 100 elements, and the methods performed by the sending device 102 in accordance with the teachings herein and by reference to the remaining figures. FIG. 2 is a logical flowchart illustrating a method 200, performed by the sending device 102, for providing spatially selectable communications using deconstructed and delayed data streams in accordance with some embodiments. At 202, the sending device 102 receives a data stream from a data source. A data stream can be a command or any other type of data, and comprises a sequence of digital data elements or items. A data element can be a bit, a byte, a decimal digit, a hexadecimal (i.e., hex) digit, two bits, 128 bytes, eight bytes, and the like. For example, a data stream 128 includes three data elements 01, 10, and 11, each of which is a two-bit data element. The source or provider of a data stream is herein termed as a data source. A data source can be, but is not limited to, a database, an application server, a computer file, and an electronic device.

The sending device 102, at 204, receives an indication of a target point in space and an indication of a target volume around the target point. A target point is a point in three dimensional space, which can be indicated and expressed as a Cartesian coordinate tuple, (x, y, z), in a Cartesian coordinate system. In this illustrative embodiment, an indication of a target point is a coordinate tuple (x, y, z) indicating the target point in three dimensional space. A target volume is defined as a spatial volume around a target point in three dimensional space. The target volume can be any geometric volume shape such as a sphere, ovoid, rectangular prism, a cube, etc, around the target point. When the target volume is a sphere or ovoid, it can be indicated and expressed as a radius from a target point. In this illustrative embodiment, an indication of a target volume is a radius indicating the target volume as a sphere centered on the target point.

At 206, the sending device 102 deconstructs the received data stream into a plurality of modulated data substreams based on modulation scheme. Example modulation schemes include, but are not limited to, amplitude and frequency modulations. In this illustrative embodiment, the data stream is divided into a plurality of data substreams, and each of the plurality of data substreams is converted into a modulated data substream using a modulation scheme. A data substream of a data stream includes a subset (meaning some, but not all) data elements of the data stream, while a modulated data substream is a digitally encoded representations of a data substream based on a modulation scheme. Each modulated data substream is a sequence of digital data elements (such as bits) that is an abstract and digital representation of the shape and form of a signal such as a wave moving in a physical medium.

Based on a spatial relationship between each transmitter and the target point, the sending device 102, at 208, determines a transmitter delay for the each transmitter. A spatial relationship specifies how one point or object is located in space in relation (such as physical distance and relative coordinates) to another point or object. In this illustrative embodiment, a physical distance between a transmitter and a target point is used to determine transmitter delays. With application of transmitter delays in transmitting data substreams by corresponding transmitters, the sending device 102 can control the data substreams to arrive at the target point at the same or approximately the same time.

While transmitter delays enable data substreams sent from corresponding transmitters to arrive at a target point at the same time, such concurrent arrival cause collision (i.e., overlap in time) of the data substreams in receiving devices at or close to the target point. Furthermore, it is desirable that all receiving devices within, but not outside, a target volume, are able to properly receive and decode (i.e., read) the data substream. Proper receiving and decoding a data stream by a receiving device means the data elements of the data stream are received in the same order as they appear in the data stream before transmission. Additionally, proper receiving and decoding a data stream by a receiving device means that data time intervals of the received data elements satisfy a data time interval constraint. In such a case, the received elements are termed to be in a proper time alignment.

A data time interval is a time span between moments in time when two consecutive data elements are received. Where a data time interval is very small, such as zero, or is negative, the corresponding two consecutive received data elements are said to collide with each other. Consequently, the two consecutive received data elements cannot be properly received, decoded, and used to reconstruct the data stream by the receiving device. A data time interval constraint includes a minimum time limit and a maximum time limit. A data time interval satisfies a data time interval constraint when the data time interval is greater than (i.e., exceeds) the minimum time limit and is less than the maximum time limit of the constraint.

Accordingly, to achieve proper reception of a data stream by receiving devices within, but not outside, a target volume, a data interval spacing needs to be applied between the plurality of data substreams at transmission time from the transmitters. At 210, the sending device determines a data interval spacing such that data elements received by the receiving devices within, but not outside, the target volume are in proper time alignments. Each transmitter delay and the data interval spacing are a time span and often measured in, for example, milliseconds (ms) or microseconds (µs). At 212, the sending device 102 sends the plurality of modulated data substreams and, thereby, the corresponding plurality of data substreams, using the transmitter delays and the data interval spacing.

Additionally, the sending device 102, at 214, determines a data time interval constraint. The data time interval constraint is dependent on the target volume. Generally, the range of the data time interval constraint bears a direct relationship with the size of the target volume. In one embodiment, the direct relationship is implemented as a lookup table. Using the lookup table, the sending device 102 determines a data time interval constraint by locating it in the lookup table with the size of the target volume as input. At 216, the sending device 102 sends the data time interval constraint to one or more receiving devices. Alternatively, the receiving devices can be preconfigured with the data time interval constraint.

Figure 3:
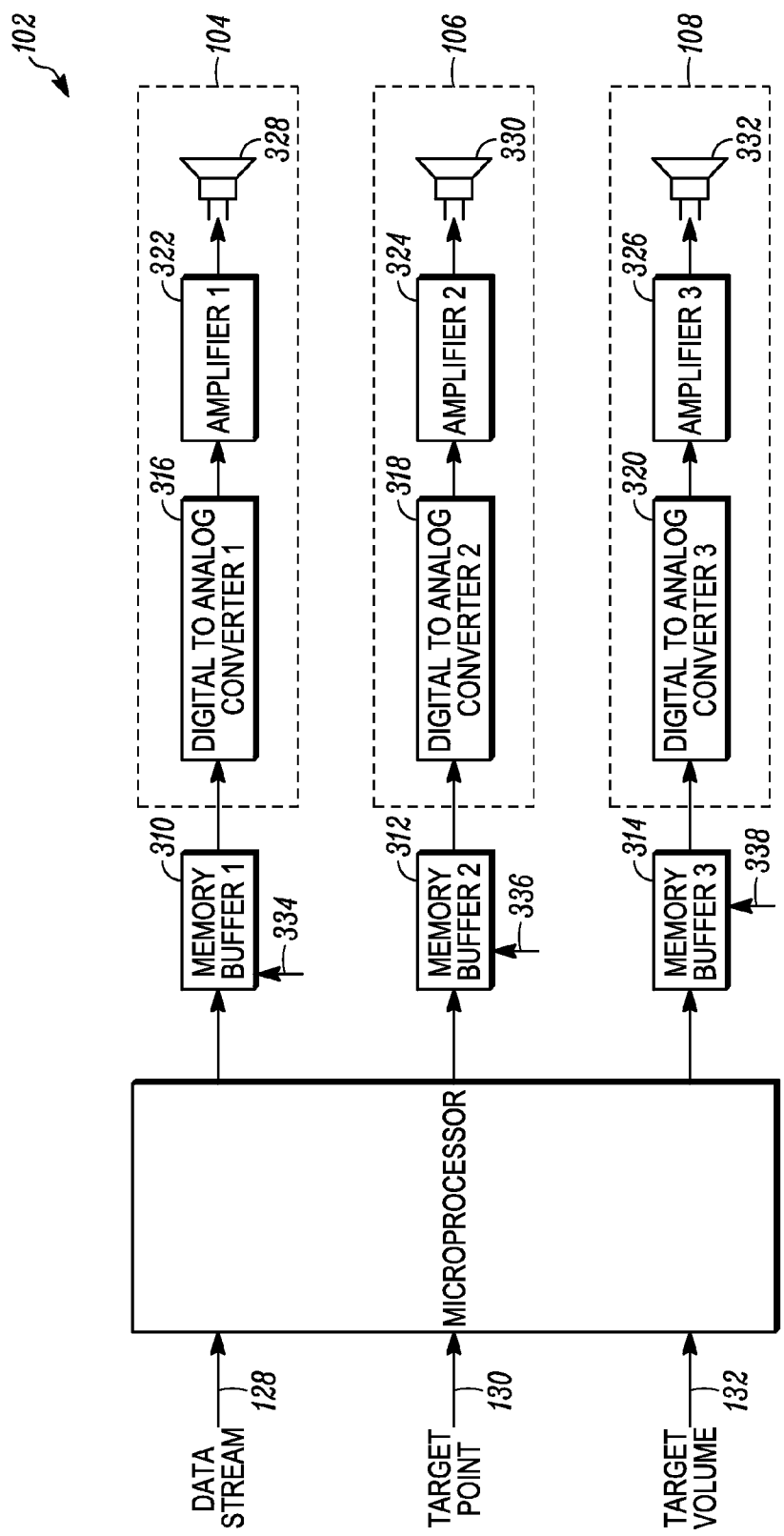
FIG. 3 illustrates a block diagram of a sending device implementing some embodiments of the present teachings.

Referring now to FIG. 3, a block diagram of the sending device 102 implementing some embodiments of the present teachings is shown. The sending device 102 includes a processing device 302 (such as a microprocessor) that receives the data stream 128 from a data source (not shown), an indication 130 of the target point 126, and an indication 132 of the target volume 124. The sending device 102 further includes three memory buffers 310-314, three digital-to-analog converters 316-320, three amplifiers 322-326, and three speakers 328-332. As used herein, a digital-to-analog converter, an amplifier, and a speaker are collectively termed as a transmitter. Accordingly, the sending device 102 includes three transmitters 104-108. The processing device 302 deconstructs the data stream 128 into three modulated data substreams that are placed into the memory buffers 310-314 respectively.

The microprocessor 302 causes modulated data substreams in the memory buffers 310-314 to be passed to the corresponding digital-to-analog converters 316-320, starting from locations indicated by corresponding ring pointers 334-338. The microprocessor 302 adjusts the values of three ring pointers 334-338 based on corresponding transmitter delays and data interval spacing. For example, the microprocessor 302 reads data from the memory buffers 310-314 and writes the data to the corresponding digital to analog converters 316-320, respectively. Alternatively, the microprocessor 302 passes data to the digital to analog converters 316-320 using Direct Memory Access. The digital-to-analog converters 316-320 convert modulated data substreams stored in the memory buffers 310-314 into analog signals. The amplifiers 322-326 drive the three speakers 328-332 respectively. Each of the amplifiers 322-326 increases the power or strength of corresponding analog signals before sending the analog signals to the corresponding speakers. The speakers 328-332 produce acoustic waves that travel through the space.

Figure 4:
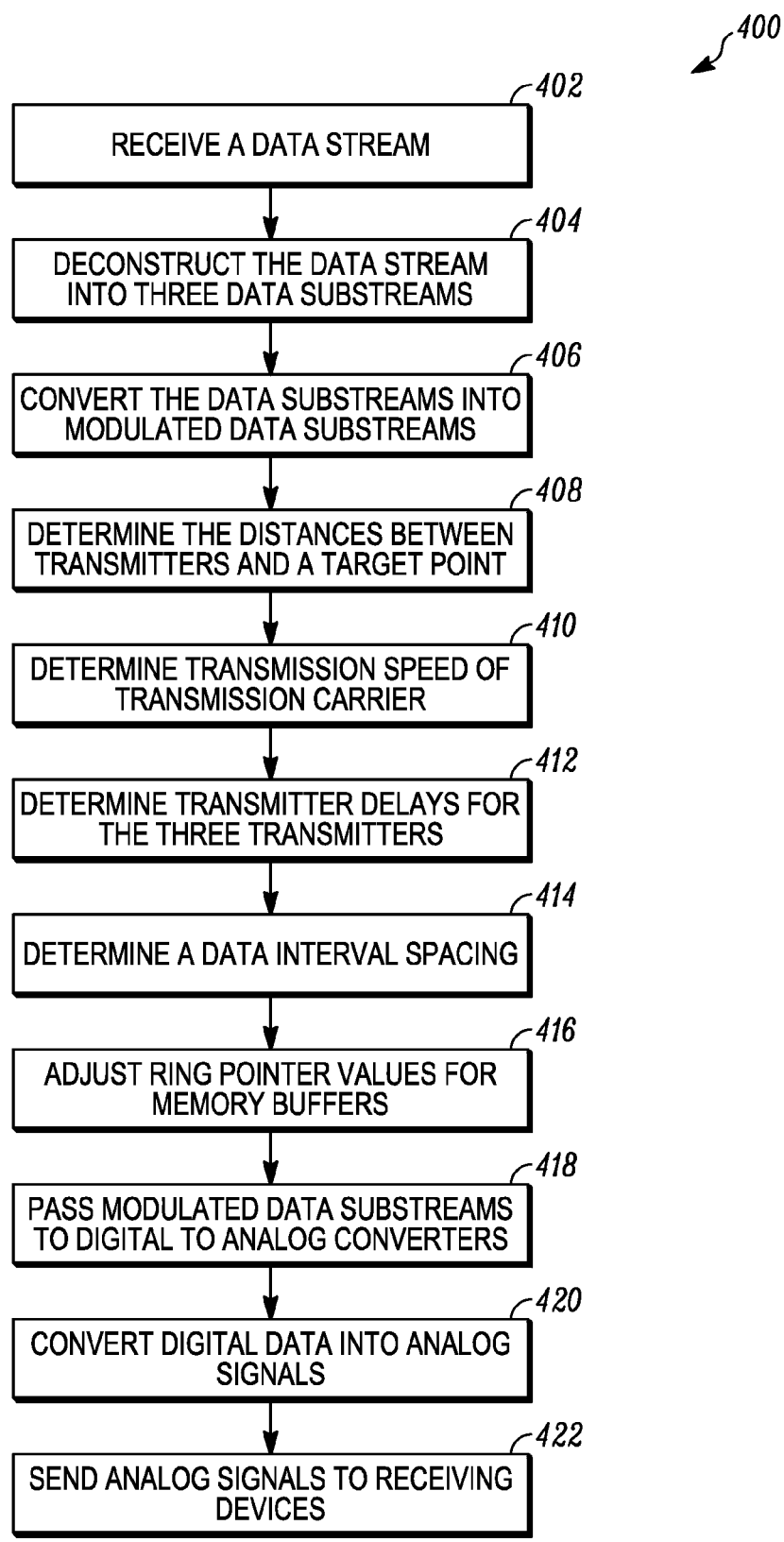
FIG. 4 is a logical flowchart illustrating a method for providing spatially selectable communications using deconstructed and delayed data streams in accordance with some embodiments.

Turning now to FIG. 4, a logical flowchart illustrating a method 400, performed by the sending device 102, for providing spatially selectable communications using deconstructed and delayed data streams in accordance with some embodiments is shown. At 402, the sending device 102 receives the data stream 128. At 404, the sending device 102 deconstructs or divides the data stream 128 into three data substreams. At 406, the sending device 102 converts the three data substreams into three modulated data substreams placed in the memory buffers 310-314. The conversion is based on a modulation scheme, such as an amplitude modulation scheme. Deconstructing the data stream and generating the three modulated data substreams are further illustrated by reference to a method 500 shown as a block diagram in FIG. 5.

Figure 5:
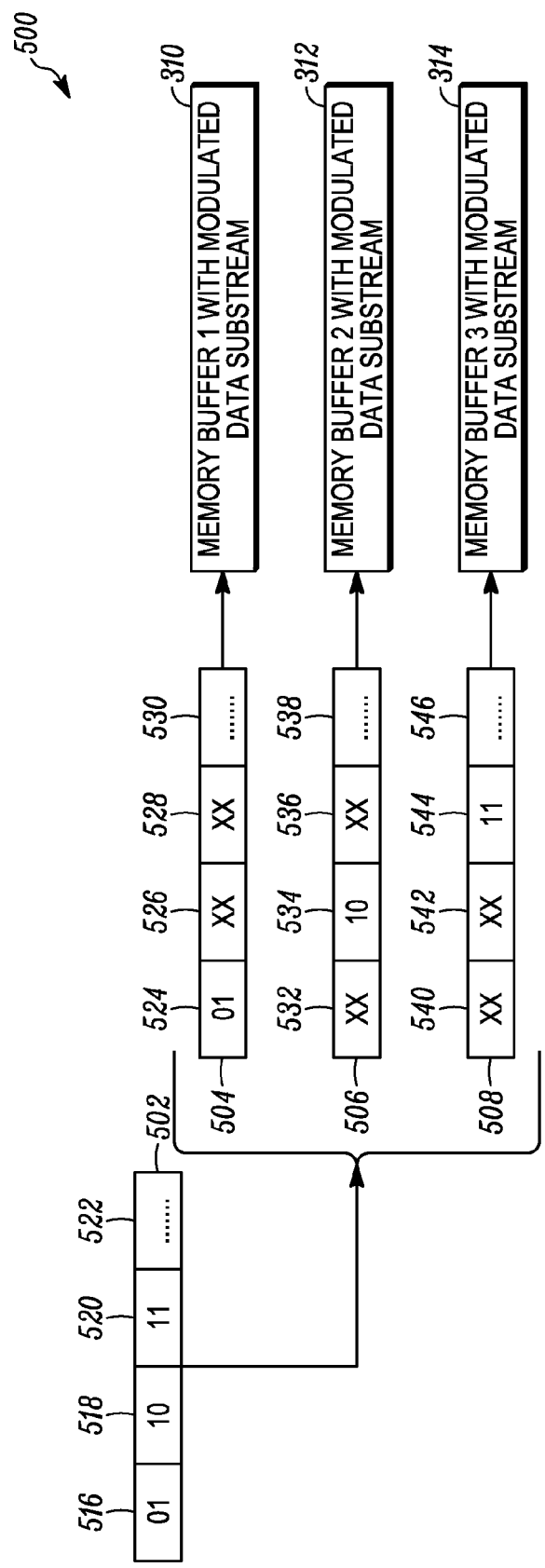
FIG. 5 is a block diagram illustrating a method for deconstructing a data stream to facilitate providing spatially selectable communications using deconstructed and delayed data streams in accordance with some embodiments.
Figure 6:
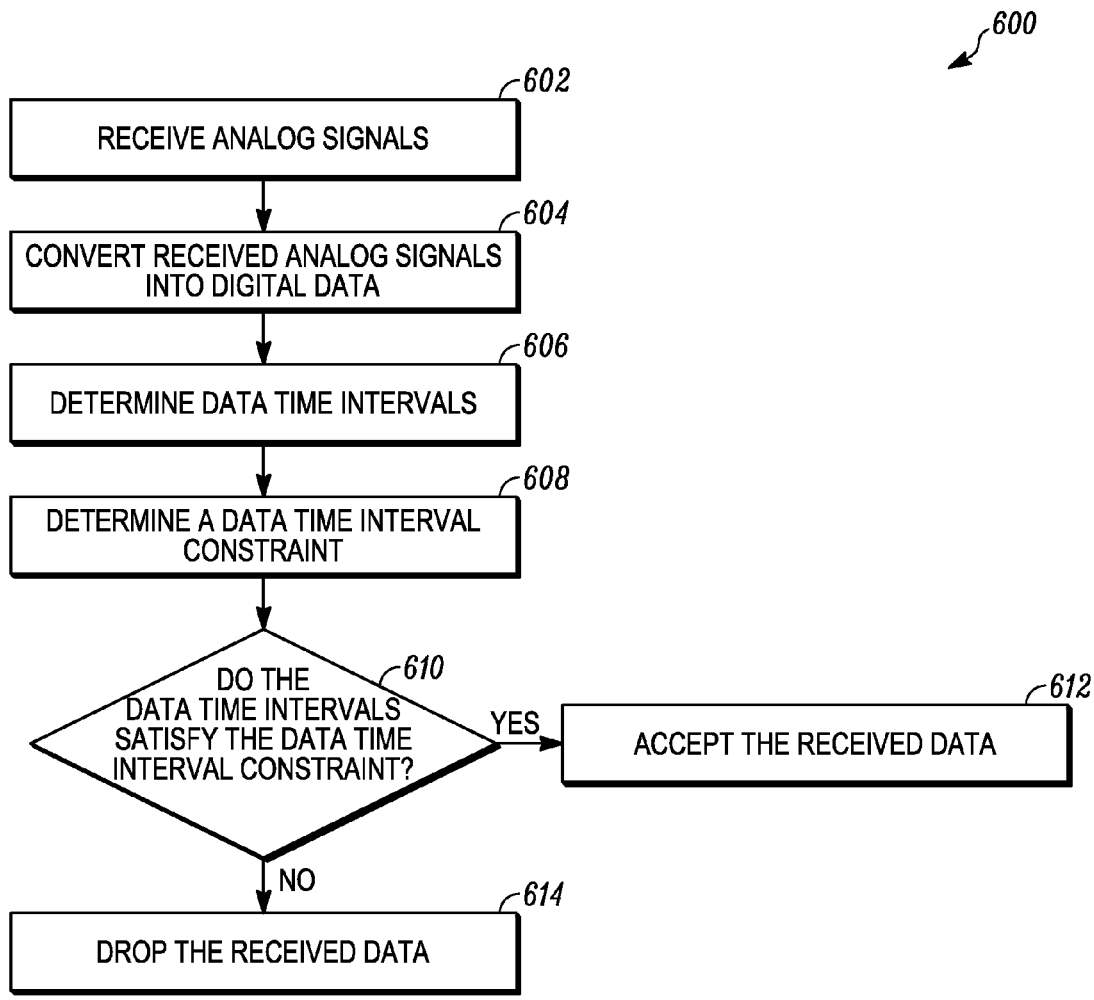
FIG. 6 is a logical flowchart illustrating a method for reconstructing a data stream to facilitate providing spatially selectable communications using deconstructed and delayed data streams in accordance with some embodiments.

Turning now to FIG. 5, a data stream 502 includes a sequence of two-bit data elements starting with 01 in field 516, 10 in field 518, and 11 in field 520. The remaining data elements of the data stream 502 are represented by field 522. The sending device 102 divides the data stream 502 into three data substreams 504-508. Each data substream includes some, but not all, data elements of the data stream 502. Additionally, the data substreams 504-508 contain other data. For example, data elements in fields 516-520 are placed in fields 524, 534, and 544 of the data substreams 504-508, respectively. Furthermore, a special data element xx (meaning there is no sound) is placed in fields 526-528, 532, 536, 540-542. Fields 530, 538, and 546 include data elements stored in field 522 and additional special data elements. The sending device 102, using a modulation scheme, converts the data substreams 504-508 into modulated data substreams and places them into the corresponding memory buffers 310-314.

Turning now back to the detailed description of FIG. 4, at 408, the sending device 102 determines the physical distances between the target point 126 and the three transmitters 104-108, using the formula:

Distance=$((x_2-x_1)^2+(y_2-y_1)^2+(z_2-z_1)^2)^{1/2}$, wherein the Cartesian coordinates($x_1$, $y_1$, $z_1$) represent a transmitter and($x_2$, $y_2$, $z_2$) represents the target point in a three dimensional space.

At 410, the sending device 102 determines the transmission speed of the transmission carrier used to send the data stream. In this illustrative embodiment, sound energy is the transmission carrier having a transmission speed of about 1126 feet per second (ft/s). At 412, the sending device 102 determines three transmitter delays for the three transmitters 104-108 based on the transmission speed and the distances between each of the transmitters 104-108 and the target point 126.

For example, where the physical distances between three transmitters 104-108 and the target point 126 are 61 feet, 68 feet, and 58 feet, the analog signal traveling time from the three transmitters 104-108 to the target point 126 are 54.174 ms(=61 feet/1126 ft/s), 60.391 ms(=68 feet/1126 ft/s), and 51.510 ms(=58 feet/1126 ft/s), respectively. Transmitter delays are then computed relative to the smallest signal traveling time. Accordingly, the transmitter delays for the three example transmitters 104-108 are 2.664 ms (=54.174 ms−51.510 ms), 8.881 ms (=60.391 ms−51.510 ms), and 0 ms (=51.510 ms−51.510 ms), respectively. With application of the transmitter delays in sending analog signals from the three example transmitters 104-108, analog signals sent from the three example transmitters 104-108 can be controlled to arrive at the target point 126 at the same or approximately the same time. Accordingly, compared to the data substream sent by the transmitter 108, data substreams, sent by the transmitters 106-108 are delayed and, thereby, termed herein as delayed data streams.

To allow only receiving devices within the target volume 124 to properly receive and decode received data stream, a data interval spacing is further determined at 414. Generally, the size of a target volume bears a direct relationship with the corresponding data interval spacing. In one embodiment of the present teachings, this relationship is implemented as a lookup table. A data interval spacing is determined by retrieving it from the lookup table using the corresponding target volume as input. The lookup table can also be implemented to reflect the relationship between the receiving devices within a target volume and the corresponding data interval spacing. Alternatively, a data interval spacing can be determined using mathematical formulas.

Assuming that a data interval spacing is determined to be 0.01 ms in the above example scenario, the transmission delays for the three transmitters 104-108 are 2.674 ms (=2.664 ms+0.01 ms), 8.901 ms (8.881 ms+0.01 ms+0.01 ms), and 0 ms, respectively. A transmission delay for a transmitter is a combination of a data interval spacing and a transmitter delay for the transmitter. With application of the combined transmission delays, consecutive data elements sent from the three example transmitters can be controlled to be received, by receiving devices at or near the target point, 0.01 ms or approximately 0.01 ms apart.

At 416, the sending device 102 applies the transmission delays by adjusting the values of three ring pointers 334-338 for the three memory buffers 310-314 containing the modulated data substreams. In other words, the sending device 102 adjusts the values of the three ring pointers 334-338 to reflect the respective transmission delays. For example, where adjacent values in the memory buffer 310 are 1 μs apart and the transmission delay for the transmitter 104 is 2.573 ms, 2573 is subtracted from the ring pointer 334. At 418, the sending device 102 causes the modulated data substreams in the memory buffers 310-314 to be passed to the corresponding digital-to-analog converters 316-320, starting from locations indicated by the respective ring pointers 334-338. When a ring pointer reaches the end of a memory buffer, the ring pointer moves back to the beginning of the memory buffer. In other words, the memory buffers and ring pointers function together in a circular manner. Accordingly, the sending device 102 keeps filling (such as by running a separate thread) the memory buffers 316-320 in a circular manner.

At 420, the three digital-to-analog converters 316-320 convert corresponding modulated data substreams to analog signals. At 422, the sending device 102, using the three transmitters 104-108, transmits the converted analog signals to receiving devices. Accordingly, the three transmitters 104-108 send the three data substreams generated at 404, respectively. Upon reception of analog signals, the receiving devices convert them back into digital data elements. Reception of the data elements is further illustrated by reference to a method 600 shown as a flowchart in FIG. 6.

A receiving device, such as the receiving devices 110-122, at 602, receives the analog signals sent by each of the three transmitters 104-108. At 604, using an analog-to-digital converter, the receiving device converts the received analog signals to digital data elements. When the receiving device is within the target volume 124, it should be able to properly receive and decode the data elements. In other words, the received data elements are in a proper time alignment. Conversely, when the receiving device is outside of the target volume 124, it should not be able to properly receive and decode the data elements.

For example, as indicated in FIG. 1, the receiving devices 116, 120, and 122 receive the data elements, 01, 10, and 11, in the same order as they appear in the data stream 128. The data time intervals between consecutive received data elements for both receiving devices 120 and 122 satisfy a data time interval constraint. Accordingly, the receiving devices 120-122 properly receive the data stream 128 and can decode the received data stream. However, the data time interval, between the received data elements 10 and 11 in the receiving device 116, is greater than the maximum time limit of the data time interval constraint and, thereby, fails to satisfy the data time interval constraint. Accordingly, the receiving device 116 cannot properly decode the received data stream of data elements 01, 10, and 11.

In another example, as indicated in FIG. 1, the receiving device 118 receives the data element 11 before the data element 10. Accordingly, the receiving device 118 receives the data elements, 01, 10, and 11, in a different order from the order they appear in the data stream 128. Therefore, the receiving device 118 fails to properly receive the data stream and cannot properly decode the received data stream of data elements 01, 11, and 10. In yet another example, the receiving device 110 receives the data elements 01 and 10 in the same order as they appear in the data stream 128. However, the data time interval between the two consecutive received data elements 01 and 10 is less than zero and, thereby, data elements 01 and 10 collide. Accordingly, the receiving device 110 fails to properly receive the data stream and cannot properly decode the received data stream of data elements 01, 11, and 10.

To determine whether the received data elements are in a proper time alignment, at 606, the receiving device determines a data time interval between every two consecutive received data elements by calculating the time span between moments in time when the two data elements are received. At 608, the receiving device determines a data time interval constraint by retrieving it from, for example, an internal memory, file, or a database. Generally, the data time interval constraint is either received from a transmitter inside a sending device, or provisioned as part of a system or device setup. At 610, the receiving device applies the data time interval constraint against the data time intervals determined at 606. If the data time intervals satisfy the data time interval constraint, the receiving device accepts and processes the received data elements at 612. In other words, the receiving device properly receives and decodes the received data stream comprising the received data elements. Otherwise, the receiving device, at 614, drops or ignores the received data elements. Accordingly, the receiving device, at 610, decides an acceptability of the received data elements based on the data time interval constraint.

Figure 7:
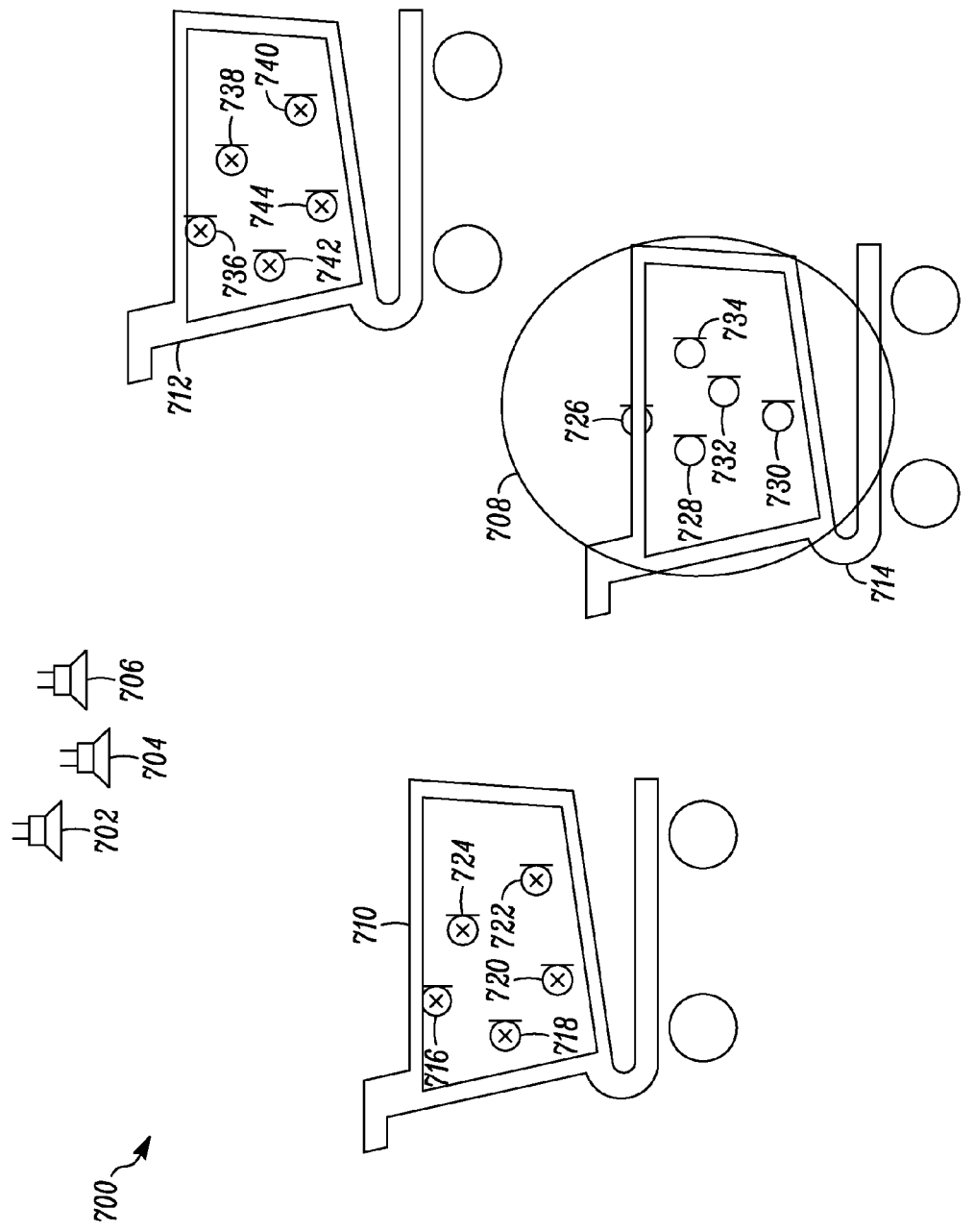
FIG. 7 is a block diagram illustrating a wireless communication system in accordance with some embodiments.

Example wireless communication systems implementing the present teachings are illustrated by reference to FIGS. 7 and 8. In FIG. 7, three audio transmitters 702-706 inside an audio sending device (not shown) send a data stream to audio receiving devices 716-744 using sound waves as a transmission carrier. Audio receiving devices 716-744 are attached to shopping products or other objects. The audio receiving devices 726-734 are carried by a shopping cart 714, the audio receiving devices 716-724 are carried by a shopping cart 710, and the audio receiving devices 736-744 are carried by a shopping cart 712. Alternatively, the audio receiving devices 716-744 are moved on a conveyor belt.

In this example system, only audio receiving devices inside a target volume 708 are able to properly receive and decode received data stream. When the shopping cart 714 roams into the target volume 708, the audio receiving devices 726-734 are within the target volume 708 and are, thereby, able to receive data streams from the audio transmitters 702-706 properly. In other words, the time alignment of received data elements inside each of the audio receiving devices 726-734 is proper. Conversely, the time alignment of received data elements inside each of the audio receiving devices 716-724 and 736-744 is not proper, and these receiving devices, thereby, cannot utilize the received data elements. However, when either shopping cart 710 or shopping cart 712 roams into the target volume 708, the audio receiving devices carried by it are then able to properly receive data streams from the audio transmitters 702-706.

Figure 8:
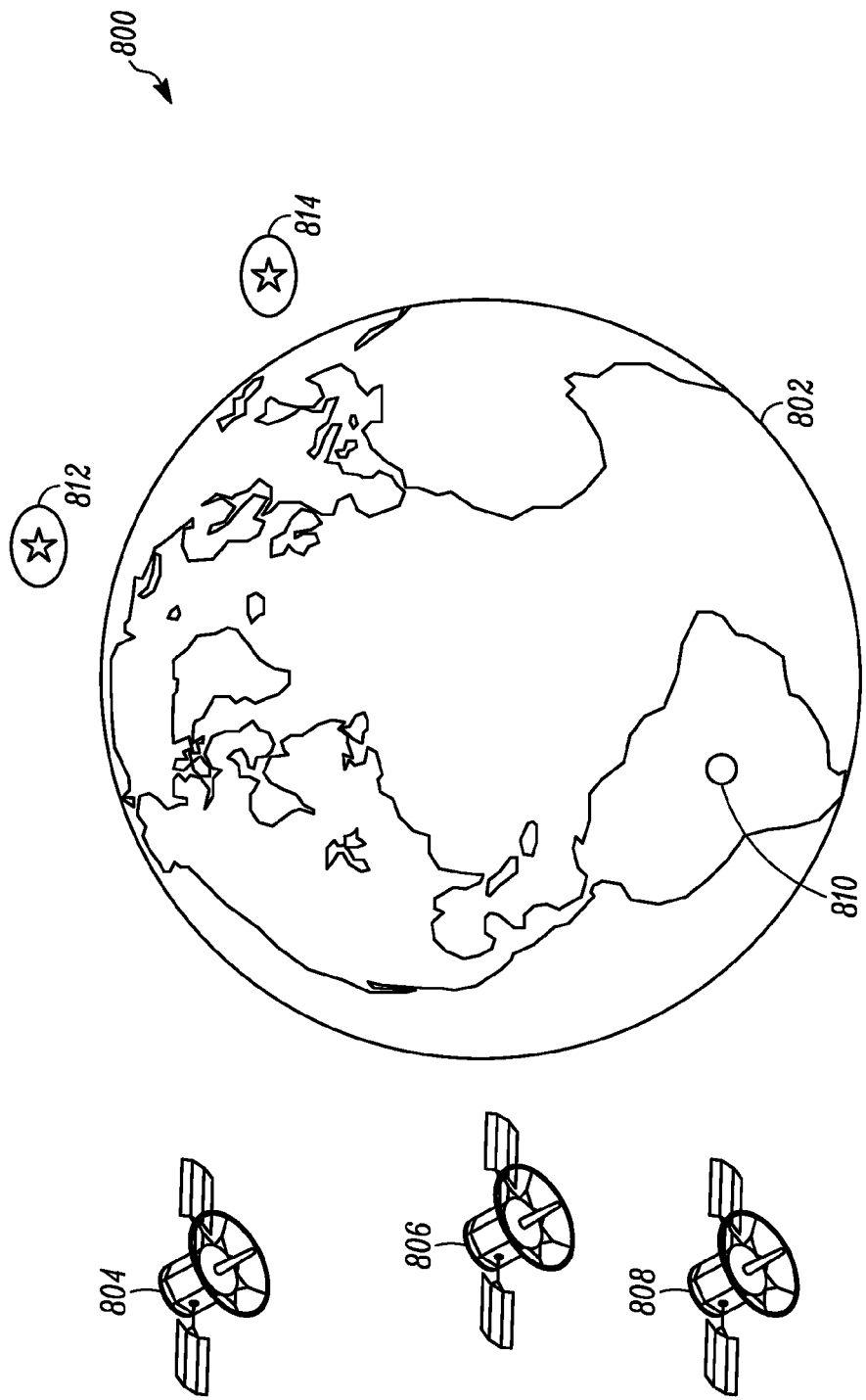
FIG. 8 is a block diagram illustrating a wireless communication system in accordance with some embodiments.

Turning now to FIG. 8, three satellites 804-808 are three transmitters and collectively function as a sending device. A target volume 810 is a selected area on or a sphere above the surface of the Earth 802. In accordance with the present teachings, only receiving devices within the target volume 810 are able to properly receive data streams sent from the three satellites 804-808. Receiving devices at all other locations on the Earth 802 or in space are unable to properly receive the data streams. For example, receiving devices inside spatial volumes 812 and 814 are unable to properly receive the data streams. In this example embodiment, the transmission carrier is radio frequency energy. When the data interval spacing is reduced to a value close to zero, it is possible that only a receiving device, located at the target point of the target volume 810, can properly receive the data streams from the three satellites 804-808. Accordingly, communication security without deploying encoding and/or encryption technologies is achieved.

In yet another embodiment of the present teachings, the receiving devices 110-122 operate in a low power consumption state (e.g., sleep mode) when they are not busy with receiving, decoding, and processing data streams from the sending device 102. They wake up from the sleep mode (meaning transition from one state to another state) and then operate in a normal operating state when a data stream with proper time alignment is received. Accordingly, the sending device 102 can use a data stream to wake up all receiving devices within a target volume, while keeps other receiving device outside of the target volume in sleep mode.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for providing spatially selectable communications using deconstructed and delayed data stream as described herein. The non-processor circuits may include, but are not limited to, a radio receiver, a radio transmitter, signal drivers, clock circuits, power source circuits, and user input devices. As such, these functions may be interpreted as steps of a method to perform the providing spatially selectable communications described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing spatially selectable communications using deconstructed and delayed data streams, wherein the method is performed by a sending device, the method comprising:

receiving a data stream into the sending device from a data source, wherein the sending device includes a plurality of transmitters;

receiving an indication of a target point for the data stream and a target volume around the target point;

deconstructing the data stream into a plurality of data substreams, wherein each data substream is sent by a different one of the plurality of transmitters;

determining a corresponding transmitter delay for each transmitter used to send one of the plurality of data substreams, wherein the transmitter delay is based on a spatial relationship between the target point and corresponding transmitter used to transmit the one of the plurality of data substreams;

determining, based on the target volume, a data interval spacing to apply between each data substream at transmission, wherein the applied data interval spacing and the transmitter delays prevent reconstruction of the plurality of data substreams back into the data stream in all areas in space except within the target volume; and sending, from the plurality of transmitters, the plurality of data substreams using the corresponding transmitter delay and with the data interval spacing between each data substream.

2. The method of claim 1, wherein each data substream is sent over a same transmission carrier, wherein the corresponding transmitter delay is further determined based on the transmission carrier.

3. The method of claim 2, wherein the transmission carrier is sound energy.

4. The method of claim 2, wherein the transmission carrier is radio frequency energy.

5. The method of claim 2, wherein the transmission carrier is light energy.

6. The method of claim 1, wherein the spatial relationship comprises a physical distance.

7. The method of claim 1, wherein deconstructing the data stream into a plurality of data substreams comprises:

dividing the data stream into a plurality of data substreams; and converting the plurality of data substreams into a plurality of modulated data substreams using a modulation scheme.

8. The method of claim 1 further comprising determining a data time interval constraint based on the target volume, wherein the data time interval constraint further prevents reconstruction of the data substreams back into the data stream in all areas in space except within the target volume.

9. The method of claim 8 further comprising sending the data time interval constraint to at least one receiving device.

10. The method of claim 1, wherein the data stream is used to wake up all receiving devices within the target volume.

11. An apparatus for providing spatially selectable communications using deconstructed and delayed data streams, the apparatus comprising:

a plurality of transmitters each configured to send data substreams using a same transmission carrier;

an interface configured to receive a data stream from a data source and to receive an indication of a target point for the data stream and a target volume around the target point; and a processing device configured to:

divide the data stream into a plurality of data substreams;

modulate the plurality of data substreams to generate a corresponding plurality of modulated data substreams, wherein each modulated data substream is sent by a different one of the plurality of transmitters;

determine a corresponding transmitter delay for each transmitter, wherein the transmitter delay is based on a spatial relationship between the target point and corresponding transmitter and based on the same transmission carrier;

determine, based on the target volume, a data interval spacing for applying between each modulated data substream at transmission and a data time interval constraint, wherein the data interval spacing and the data time interval constraint confine reconstruction of the plurality of data substreams back into the data stream to an area within the target volume; and control the plurality of transmitters to send the corresponding plurality of modulated data substreams using the corresponding transmitter and with the data interval spacing between each modulated data substream.

12. The apparatus of claim 11, wherein the same transmission carrier comprises one of sound energy, radio frequency energy, or light energy.

13. The apparatus of claim 11, wherein the spatial relationship comprises a physical distance.

14. The apparatus of claim 11, wherein the plurality of transmitters comprises at least three transmitters.

15. A non-transient computer-readable storage element having computer readable code stored thereon for programming a computer within a sending device having a plurality of transmitters to perform a method for providing spatially selectable communications using deconstructed and delayed data streams, the method comprising:

receiving a data stream from a data source;

receiving an indication of a target point for the data stream and a target volume around the target point;

generating a plurality of data substreams from the data stream for sending each data substream using a different one of the plurality of transmitters;

determining a corresponding transmitter delay for each transmitter used to send one of the plurality of data substreams, wherein the transmitter delay is based on a physical distance between the target point and corresponding transmitter used to transmit the one of the plurality of data substreams;

determining, based on the target volume, a data interval spacing for applying between each data substream at transmission and a data time interval constraint, wherein the applied data interval spacing and the data time interval constraint prevent reconstruction of the plurality of data substreams back into the data stream in all areas in space except within the target volume; and sending the plurality of data substreams using the corresponding transmitter delay and with the data interval spacing between each data substream.

16. The non-transient computer-readable storage elements of claim 15, wherein each data substream is sent over a same transmission carrier, wherein the corresponding transmitter delays are further determined based on the transmission carrier.

17. The non-transient computer-readable storage elements of claim 15, wherein the transmission carrier comprises one of sound energy, radio frequency energy, or light energy.

18. The non-transient computer-readable storage elements of claim 15, wherein generating the plurality of data substreams comprises:

dividing the data stream into a plurality of data substreams; and converting the plurality of data substreams into a plurality of modulated data substreams using a modulation scheme.

* * * * *